United States Patent [19]

Tom

[11] Patent Number: 4,696,953
[45] Date of Patent: Sep. 29, 1987

[54] SCAVENGERS FOR THE REMOVAL OF IMPURITIES FROM ARSINE AND PHOSPHINE

[75] Inventor: Glenn M. Tom, Wilmington, Del.

[73] Assignee: Hercules Incorporated, Wilmington, Del.

[21] Appl. No.: 938,701

[22] Filed: Dec. 5, 1986

Related U.S. Application Data

[62] Division of Ser. No. 888,180, Jul. 21, 1986, Pat. No. 4,659,552.

[51] Int. Cl.$^4$ ............................................. C08F 14/00
[52] U.S. Cl. ................................ 521/146; 210/502.1; 521/53
[58] Field of Search ................ 521/146, 53; 210/502.1

[56] References Cited

U.S. PATENT DOCUMENTS

| | | | |
|---|---|---|---|
| 4,128,706 | 12/1978 | Seita et al. | 521/53 |
| 4,235,973 | 11/1980 | Tschang et al. | 521/146 |
| 4,246,351 | 1/1981 | Miyake et al. | 521/146 |
| 4,276,395 | 6/1981 | Volhardt et al. | 521/53 |
| 4,543,365 | 9/1985 | Itagaki et al. | 521/146 |
| 4,564,509 | 1/1986 | Shealy et al. | 423/210.5 |
| 4,565,677 | 1/1986 | Yusa | 423/219 |

Primary Examiner—Morton Foelak
Attorney, Agent, or Firm—Joanne W. Patterson

[57] ABSTRACT

Disclosed are macroreticulate polymer scavengers functionalized with arsenic or phosphorus compounds. These scavengers are used for removing oxidants, protic acids and compounds that can be metallated, from arsine and phosphine.

3 Claims, No Drawings

SCAVENGERS FOR THE REMOVAL OF IMPURITIES FROM ARSINE AND PHOSPHINE

This application is a division of application Ser. No. 888,180, filed 7/21/86, now U.S. Pat. No. 4,659,552.

FIELD OF THE INVENTION

This invention relates to macroreticulate polymer scavengers functionalized with arsenic or phosphorus compounds. This invention especially relates to the use of these scavengers to remove oxidants, protic acids and compounds that can be metallated, from arsine and phosphine.

BACKGROUND OF THE INVENTION

The presence of impurities such as water, oxygen and carbon dioxide in reactant gases used in the semiconductor industry causes undesirable changes in semiconductor properties. These properties include optical life-times in excited states (solar cell applications), epitaxy and electrical resistivity. A method for obtaining high purity gas streams would therefore be desirable.

SUMMARY OF THE INVENTION

It has now been found that impurities such as oxygen, water, and carbon dioxide can be removed from arsine and phosphine, commonly used as doping agents for semiconductors. The impurities are removed by contacting the gas to be purified with a macroreticulate polymer scavenger.

The macroreticulate polymer scavengers of this invention comprise the reaction product of (1) a hydride selected from the group consisting of arsine and phosphine and (2) a metallated macroreticulate polymer having a plurality of pendant functional groups or mixtures of functional groups having the general formula:

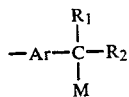

where Ar is an aromatic hydrocarbon radical containing from one to three rings, $R_1$ and $R_2$ are the same or different and are selected from the group consisting of hydrogen and alkyl hydrocarbon radicals containing from 1 to 12 carbon atoms, and M is a metal selected from the group consisting of sodium, potassium and lithium, the metallated macroreticulate polymer having within its pores a compound selected from the group consisting of a 1–12 carbon alkyl compound of M and a hydride of M, or mixtures thereof.

DETAILED DESCRIPTION OF THE INVENTION

The macroreticulate polymer scavengers of this invention are prepared by reacting arsine or phosphine with a metallated macroreticulate polymer. The macroreticulate polymer that is used as the starting material for the metallated polymer is described in our copending application Ser. No. 655,856 now U.S. Pat. No. 4,603,148.

The metallation can be achieved by contacting the macroreticulate polymer with a stoichiometric excess of a solution containing an alkyl compound of lithium, sodium or potassium, where the alkyl group is a 1–12 carbon alkyl group. Normal-butyllithium is preferred.

Typical solvents for the metal alkyl compound include aliphatic hydrocarbons, aromatic hydrocarbons and ethers. The metallation is carried out at ambient temperature and pressure. The contact time is typically in the range of from about 10 minutes to about 10 hours. Because an excess of the metallating agent is used, unreacted metallating agent remains within the pores of the macroreticulate polymer. The unreacted reagent is believed to be strongly bound in clusters to the metal immobilized in the functional groups on the polymer.

The metallated macroreticulate polymer produced in the manner described above has a plurality of pendant metallated functional groups or mixtures of functional groups having the general formula:

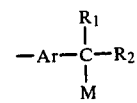

Ar is any aromatic hydrocarbon radical containing from one to three rings, such as phenylene, naphthylene, anthracene, fluorenylene and the like. Phenylene is preferred.

$R_1$ and $R_2$ are the same or different and can be hydrogen or an alkyl hydrocarbon radical having from 1 to 12 carbon atoms. Typical alkyl hydrocarbon radicals include methyl, ethyl, and the various isomers of propyl, butyl, pentyl, hexyl, octyl, decyl and dodecyl.

M is a metal selected from the group consisting of lithium, sodium and potassium.

For some applications it may be desirable to subject the metallated macroreticulate polymer to a thermal ageing process. The thermal ageing process involves heating the polymer at a high temperature, preferably from about 140° C. to about 250° C., for several hours, preferably more than six hours. Depending upon the time and temperature used, some or all of the unreacted metal alkyl compound in the pores of the polymer is thus decomposed to form the corresponding metal hydride. The thermal ageing is carried out in such a manner that the gaseous reaction products can be removed either under vacuum or under an inert gas purge to prevent undesirable side reactions.

The reaction of the metallated macroreticulate polymer with arsine or phosphine to form the macroreticulate polymer scavenger of this invention is exothermic. The delivery rate of the arsine or phosphine must be controlled to moderate the reaction so that the increase in the bed temperature is never more than 50° C. The delivery rate is controlled either by dilution of the arsine or phosphine with a carrier gas, e.g., hydrogen, or by adding concentrated arsine or phosphine slowly. Although the exact mechanism of the reaction is not known, arsine and phosphine are believed to react with both the metallated functional groups on the polymer and with the metal alkyl or metal hydride within the pores of the polymer.

The macroreticulate polymer scavengers of this invention effectively remove a wide variety of impurities such as oxidants, protic acids and compounds that can be metallated, from arsine and phosphine. The term protic acids refers to acids that can generate a proton, e.g., water, alcohols and carboxylic acids. Representative metallatable compounds that can be removed include $CO_2$ and trichlorosilane. Representative oxidants that can be removed include oxygen, chlorine and fluorine. The level of these impurities in the arsine or phosphine is preferably reduced to less than one part per million.

The impurities are removed by contacting the gas to be purified with a scavenger comprising the reaction product of the gas and the metallated macroreticulate polymer described above.

The macroreticulate polymer scavengers of this invention can also be used in an arsine or phosphine doping agent delivery system. When the scavenger is treated with a proton source, e.g., water or hydrogen, the desired hydride doping agent is released. Thus the solid scavenger functionalized with arsenic or phosphorus can be stored, and the gaseous arsine or phosphine is released only when it is needed.

EXAMPLE 1

Amberlite XAD4, a macroreticulate styrene-divinylbenzene copolymer manufactured by Rohm and Haas, is washed with three bed volumes of water, then methanol, then isopropanol and finally hexane. One bed volume is equal to the volume of the unfilled bed. The polymer is placed in a reaction vessel and dried for about two hours under a stream of nitrogen at 120° C. The reaction vessel is then flooded with 1.6M n-butyllithium and the solvent is removed under a nitrogen stream at 65° C. The polymer is washed quickly with 2-4 bed volumes of hexane to remove surface n-butyllithium and dried at 120° for 16 hours. The metallated macroreticlate polymer is then aged by heating under a stream of nitrogen at 210° C. (wall temperature of reactor) for 12 hours.

An arsenic-functionalized scavenger is prepared by contacting a 1 liter bed of the metallated macroreticulate polymer, prepared as described above, with a mixture of arsine (10% by volume) and hydrogen at a flow rate of 245 l/hr until a total of 490 liters of the arsine/hydrogen mixture (2 moles of arsine) has passed through the bed. The bed of arsenic-functionalized scavenger is then purged with electronic grade arsine containing oxygen and 10 ppm water. After passing through the scavenger bed, the arsine contains less than 1 ppm $H_2O$ and $O_2$. A residual gas analyzer is used to measure the impurity levels.

What I claim and desire to protect by Letters Patent is:

1. A macroreticulate polymer scavenger comprising the reaction product of (1) a hydride selected from the group consisting of arsine and phosphine and (2) a metallated macroreticulate polymer having a plurality of pendant functional groups or mixtures of functional groups having the general formula:

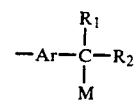

where Ar is an aromatic hydrocarbon radical containing from one to three rings, $R_1$ and $R_2$ are the same or different and are selected from the group consisting of hydrogen and alkyl hydrocarbon radicals containing from 1 to 12 carbon atoms, and M is a metal selected from the group consisting of sodium, potassium and lithium, said metallated macroreticulate polymer having within its pores a compound selected from the group consisting of a 1-12 carbon alkyl compound of M and a hydride of M, or mixtures thereof.

2. The scavenger of claim 1 wherein M is lithium, $R_1$ is H and $R_2$ is pentyl.

3. The scavenger of claim 1 wherein the metallated macroreticulate polymer is a metallated macroreticulate styrene-divinylbenzene copolymer.

* * * * *